US012728072B1

(12) United States Patent
Penrose

(10) Patent No.: US 12,728,072 B1
(45) Date of Patent: Sep. 8, 2026

(54) SYSTEM, DEVICE, AND METHOD FOR ACUPUNCTURE NEEDLE PLACEMENT

(71) Applicant: The Government of the United States as represented by the Secretary of the Air Force, Wright-Patterson AFB, OH (US)

(72) Inventor: O'Connell Penrose, Gainsville, GA (US)

(73) Assignee: United States of America as represented by the Secretary of the Air Force, Wright-Patterson AFB, OH (US)

( * ) Notice: Subject to any disclaimer, the term of this patent is extended or adjusted under 35 U.S.C. 154(b) by 142 days.

(21) Appl. No.: 18/896,764

(22) Filed: Sep. 25, 2024

Related U.S. Application Data

(60) Provisional application No. 63/685,611, filed on Aug. 21, 2024.

(51) Int. Cl.
*A61H 39/08* (2006.01)
*A61H 39/02* (2006.01)

(52) U.S. Cl.
CPC ........... *A61H 39/086* (2013.01); *A61H 39/02* (2013.01); *A61H 2201/0153* (2013.01);
(Continued)

(58) Field of Classification Search
CPC .... A61H 39/00; A61H 39/002; A61H 39/007; A61H 39/02; A61H 39/04; A61H 39/08;
(Continued)

(56) References Cited

U.S. PATENT DOCUMENTS 5,224,469 A * 7/1993 Mocny .................. A61H 39/04 600/587
7,240,806 B2 7/2007 Choi
(Continued)

OTHER PUBLICATIONS

Scott D. Mist et al.; "Reliability of AcuGraph system for measuring skin conductance at acupoints"; Acupunct Med. Sep. 2011; 29(3); 221-226.
(Continued)

*Primary Examiner* — Phong Son H Dang
(74) *Attorney, Agent, or Firm* — AFMCLO/JAZ; Richard M. Mescher

(57) ABSTRACT

An acupuncture point device inserts one of a plurality of acupuncture needles into a patient's skin at an identified acupressure point. The acupuncture point device includes an elongate casing configured to be handheld and has a passage extending through at least a portion thereof that forms an opening at a forward end of the elongate casing. A needle cartridge is located within the passage and holds the plurality of acupuncture needles. An acupressure-point locator circuit is configured to identify the acupressure point by measuring galvanic skin resistance and includes a probe located at the opening of the elongate casing for engaging the patient's skin. An actuator selectively advances at least one of the plurality of acupuncture needles through the opening of the elongate casing and into the identified acupressure point without moving the probe after the acupressure point is identified by the acupressure-point locator circuit.

20 Claims, 11 Drawing Sheets

(52) U.S. Cl.
CPC .... *A61H 2201/123* (2013.01); *A61H 2201/14* (2013.01); *A61H 2201/5048* (2013.01); *A61H 2230/655* (2013.01)

(58) Field of Classification Search
CPC .......... A61H 39/086; A61H 2201/0153; A61H 2201/123; A61H 2201/14; A61H 2201/5048; A61H 2201/655
See application file for complete search history.

(56) References Cited

U.S. PATENT DOCUMENTS

| | | | | |
|---|---|---|---|---|
| 11,517,215 | B2 | 12/2022 | Nemeh et al. | |
| 2008/0243199 | A1 | 10/2008 | Tomilson et al. | |
| 2009/0062831 | A1 | 3/2009 | Teichert et al. | |
| 2010/0191269 | A1* | 7/2010 | Kim | A61H 39/08 606/189 |
| 2017/0326029 | A1 | 11/2017 | Soliman | |
| 2021/0244614 | A1 | 8/2021 | Li et al. | |

OTHER PUBLICATIONS

"Pointer Plus Instruction Manual"; Rev. 4, Aug. 2020; Dist. By: Lhasa OMS, Inc., Weymouth, MA. USA.

* cited by examiner

SYSTEM, DEVICE, AND METHOD FOR ACUPUNCTURE NEEDLE PLACEMENT

CROSS-REFERENCE TO RELATED APPLICATIONS

This application claims the benefit of priority under 35 U.S.C. § 119(e) to U.S. Provisional Application Ser. No. 63/685,611 entitled "SYSTEM, DEVICE, AND METHOD FOR ACUPUNCTURE NEEDLE PLACEMENT" filed 21 Aug. 2024. The contents of which is expressly incorporated herein by reference in its entirety.

RIGHTS OF THE GOVERNMENT

The invention described herein may be manufactured and used by or for the Government of the United States for all governmental purposes without the payment of any royalty.

FIELD OF THE INVENTION

The present invention relates generally to acupuncture and, more particularly, to placement of acupuncture needles.

BACKGROUND OF THE INVENTION

Battlefield acupuncture ("BFA") is quickly becoming a go-to a method of treatment for not only injury on the battlefield but pain management for wounded military men, women, and veterans. See T. NORDENBERG, "Battlefield Acupuncture, An Emerging and Promising Alternative to Pain Medications," (https://www.research.va.gov/currents/0821-Battlefield-acupuncture.cfm), where it is noted that chronic pain affects more than 50 million adults in the U.S. alone.

Acupuncture is based around the brain homunculus. This is where the brain "perceives sensation" and "initiates motion" in mapped regions of the brain which are consistent amongst all humans. This is why damage in a specific part of the brain will affect sensation/motion of a specific area of the body associated with that specific area of the brain. However, in utero, the ear develops its own homunculus which cris-crosses the homunculus for the rest of the body. Subsequently, pathways for sensation of the ear cross pathways for sensation for other parts of the body (back, shoulder, hips, etc.).

When a person has chronic/traumatic pain, it is due to a circuit in the brain which is constantly stimulated by neurotransmitter release. A reduction of the released neurotransmitters in this circuit causes pain relief Auricular acupuncture takes advantage of this fact. Placing a needle in the ear causes the brain to release neurotransmitters. This occurs at the location where the sensation of that part of the ear is mapped. If that location in the brain is the same as the circuit where the patient perceives the chronic/traumatic pain more neurotransmitters will be released than the neurons in the circuit can reuptake. Subsequently, the neurotransmitters that are not transported back into the neurons diffuse away and are lost to the over stimulated circuit. With reduced neurotransmitters the circuit fires less and the perceived pain is reduced.

The efficacy of acupuncture depends heavily on accurately placing the needle. The correct location is called the "acupressure point" and can be found using an ohmmeter. Acupressure points are specific locations on the human body where pressure is applied to restore health energy flow. These acupressure points correspond to different conditions or ailments and are used in acupressure and acupuncture to relieve pain, promote healing, and balance energy etc. in the body. Acupressure points are sometimes referred to as "acupoints", "pressure points", "trigger points", and "meridian points" among others.

To find the acupressure point the physician holds the physicians head and ear still with one hand and places the ohmmeter on the patient's ear with the other hand. When the ohmmeter detects an area of high resistance it beeps or provides another indicator. The area of high resistance is the acupressure point. The physician then puts down the ohmmeter and places the needle at the acupressure point.

Commercially-available products have expanded the use of acupuncture beyond the officially trained practitioners of Traditional Chinese Medicine. For example, one commercially available ohmmeter includes a grounding hand-held probe to be held by the patient and a detection probe for engagement with the patient's skin to measure galvanic skin response, or resistance/conductivity, at an acupressure point. The ohmmeter is coupled to a control unit and a computer. The control unit can provide audible tones for properly locating the acupressure point.

A continuing difficulty, however, is accurate placement of the needles at the acupressure point. Particularly during BFA practice, where environmental conditions may interfere with accurate location of the acupressure point and placement of the needle. In a more clinical setting, even with the aid of the commercial ohmmeters, placement of the needle can be difficult due to the fact that the physician must put down the ohmmeter, pick up the needle, give his/her best guess as to where the ohmmeter indicated the acupressure point, and inserting the needle. Some physicians attempt to improve results by marking the acupressure point on patient's skin prior to putting down the ohmmeter. This may somewhat improve results but still leads to mixed outcomes. Thus, there remains a need for methods and devices that can assist in accurate placement of acupuncture needles at acupressure points to ensure effective acupuncture treatment.

SUMMARY OF THE INVENTION

The present invention overcomes the foregoing problems and other shortcomings, drawbacks, and challenges of proper placement of acupuncture needles at acupressure points to ensure effective acupuncture treatment. While the invention will be described in connection with certain embodiments, it will be understood that the invention is not limited to these embodiments. To the contrary, this invention includes all alternatives, modifications, and equivalents as may be included within the spirit and scope of the present invention.

According to one embodiment of the present invention an acupuncture system comprises a plurality of acupuncture needles for insertion into a patient's skin at one or more of a plurality of acupressure points, and an elongate casing configured to be handheld and having a passage extending through at least a portion thereof and forming an opening at a forward end of the elongate casing for passage of the plurality of acupuncture needles therethrough. A needle cartridge is located within the passage and holds the plurality of acupuncture needles. An acupressure-point locator circuit is configured to identify the plurality of acupressure points by measuring galvanic skin resistance and including a conductive probe located at the opening of the elongate casing for engaging the patient's skin, An actuator is configured to selectively advance at least one of the plurality of acupuncture needles through the opening of the elongate casing and into an identified one of the plurality of acupressure points without moving the conductive probe after the identified one of the acupressure points is identified by the acupressure-point locator circuit.

According to another embodiment of the present invention, an acupuncture device for inserting one of a plurality of acupuncture needles into a patient's skin at one or more of a plurality of acupressure points comprises an elongate casing configured to be handheld and having a passage extending through at least a portion thereof and forming an opening at a forward end of the elongate casing and a needle cartridge located within the passage and holding the plurality of acupuncture needles. An acupressure-point locator circuit is configured to identify the acupressure points by measuring galvanic skin resistance and including a probe located at the opening of the elongate casing for engaging the patient's skin. An actuator is configured to selectively advance at least one of the plurality of acupuncture needles through the opening of the elongate casing and into an identified one of the acupressure points without moving the probe after the identified one of the acupressure points is identified by the acupressure-point locator circuit.

According to yet another embodiment of the present invention, a method for inserting at least one of a plurality of acupuncture needles into a patient's skin at one or more of a plurality of acupressure points comprises the step of obtaining an acupuncture device having an elongate casing configured to be handheld and having a passage extending through at least a portion thereof and forming an opening at a forward end of the elongate casing, a needle cartridge located within the passage and holding the plurality of acupuncture needles, an acupressure-point locator circuit configured to identify the acupressure points by measuring galvanic skin resistance and including a probe located at the opening of the elongate casing for engaging the patient's skin, and an actuator configured to selectively advance at least one of the plurality of acupuncture needles through the opening of the elongate casing and into an identified one of the acupressure points. The probe is moved along and in contact the patient's skin until the acupressure-point locator circuit provides an indication that the probe is located at a first desired one of the acupressure points. After receiving the indication that the probe is located at the first desired one of the plurality of acupressure points, the actuator is triggered to advance a first one of the plurality of acupuncture needles through the opening of the elongate casing and into the patient's skin at the first desired one of the plurality of acupressure points without moving the probe from the patient's skin at the first desired one of the plurality of acupressure points.

Additional objects, advantages, and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Figure 1:
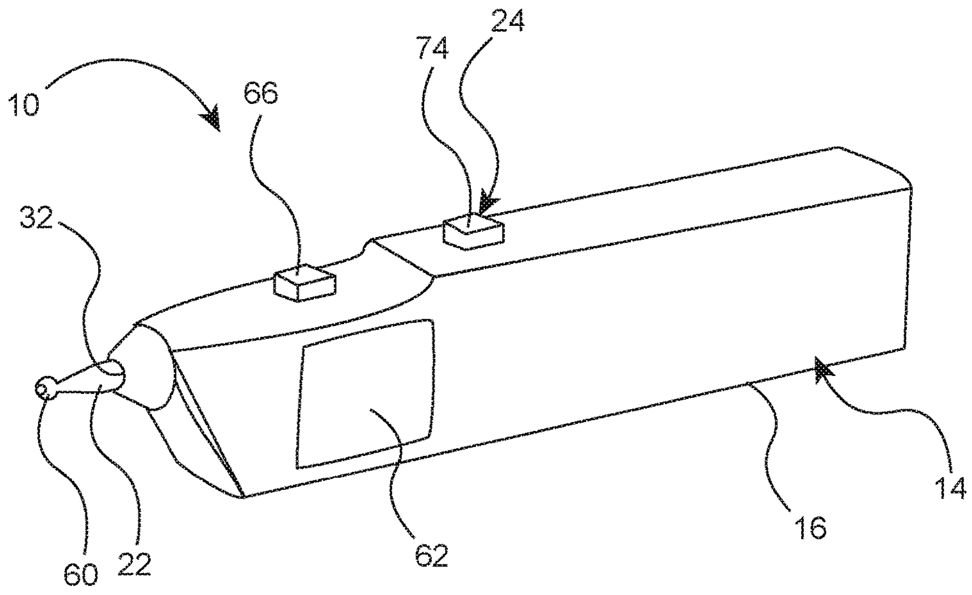
FIG. 1 is a perspective view of an acupuncture system having acupressure point device and a plurality of acupuncture needles in accordance with an embodiment of the present invention.
Figure 2:
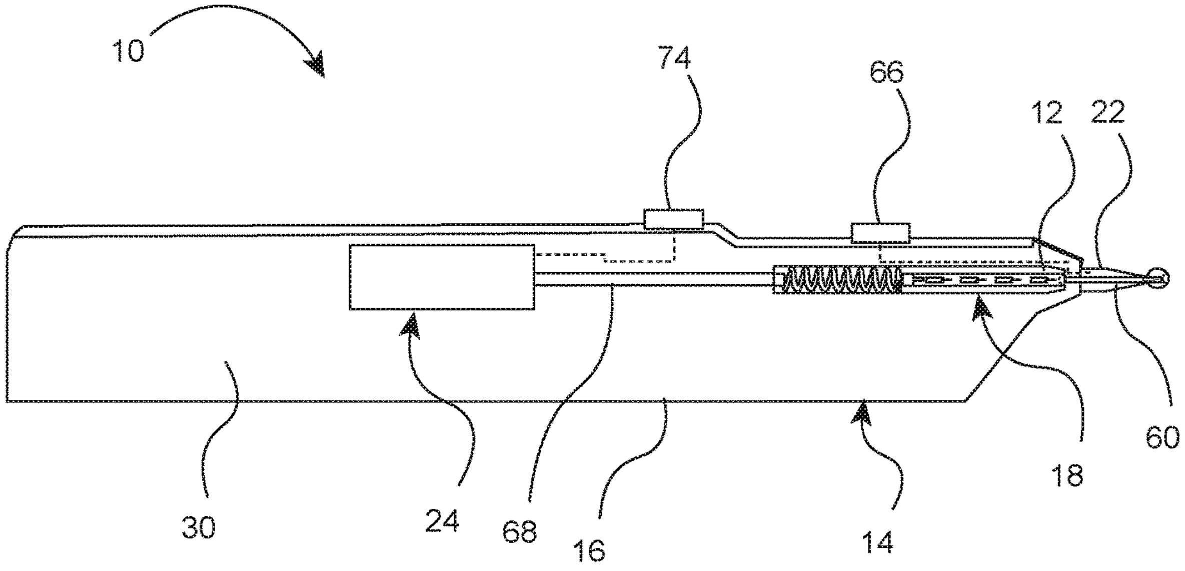
FIG. 2 is a cross-sectional view of the acupuncture system according to FIG. 1 showing a needle cartridge therein.

Referring now to the figures, and in particular to FIGS. 1 and 2, an acupuncture system 10 includes a plurality of acupuncture needles 12 and an acupressure-point device 14 according to an embodiment of the present invention. Each of the plurality of acupuncture needles 12 is configured for insertion into a patient's skin at a desired one of a plurality of acupressure points of the patient. The acupuncture needles 12 may be any suitable commercially available acupuncture needles 12. The illustrated acupressure-point device 14 includes an elongate casing 16, a needle cartridge 18 located within the casing 16 and holding the plurality of acupuncture needles 12, an acupressure-point locator circuit 20 configured to identify a desired one of the plurality of acupressure points by measuring galvanic skin resistance of the patient's skin with a conductive probe 22 engaging the patient's skin, and an actuator 24 configured to selectively advance at least one of the plurality of acupuncture needles 12 into the identified desired one of the plurality of acupressure points without moving the conductive probe 22 after the desired one of the acupressure points is identified by the acupressure-point locator circuit 20.

The acupressure-point device 14 may be an existing commercially available product modified to accommodate the needle cartridge 18 and/or any other features in accordance with embodiments of the present invention described herein. Generally, such commercially available products should be configured to measure galvanic skin resistance associated with acupressure points. Such commercially available products may include, without limitation, the Pointer Plus™ distributed by Lhasa OMS, Inc. of Weymouth, Massachusetts, USA, the AcuGraph® available from Meridia Technology Inc. of Meridian, Idaho USA, or the like.

Figure 3:
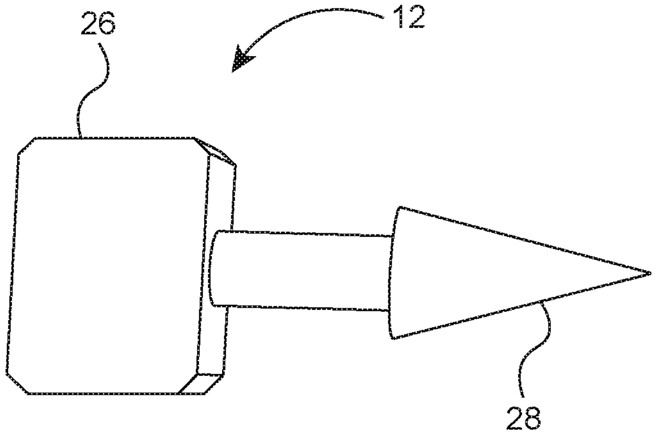
FIG. 3 is an enlarged side view of an acupuncture needle for use with the acupuncture system of FIGS. 1 and 2.
Figure 4:
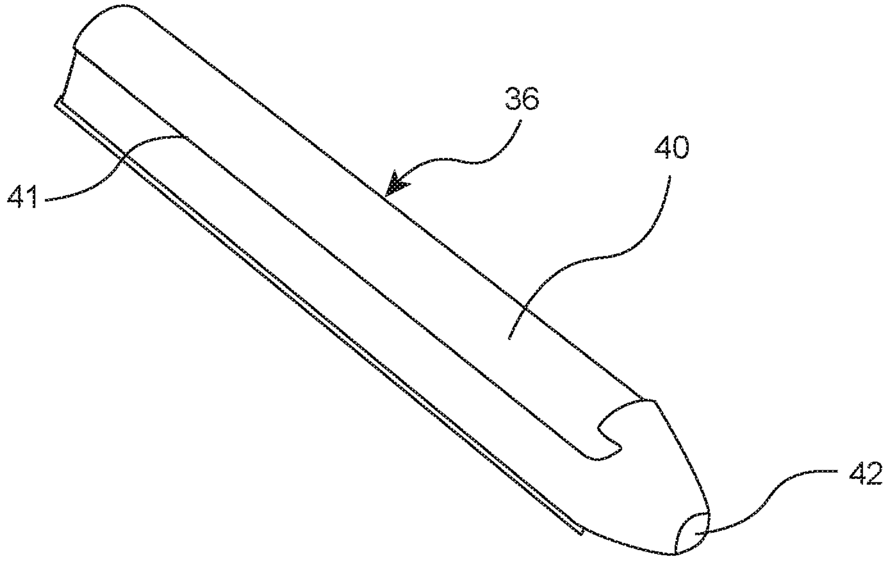
FIG. 4 is a perspective view of an elongate body of the needle cartridge of FIG. 2.
Figure 5:
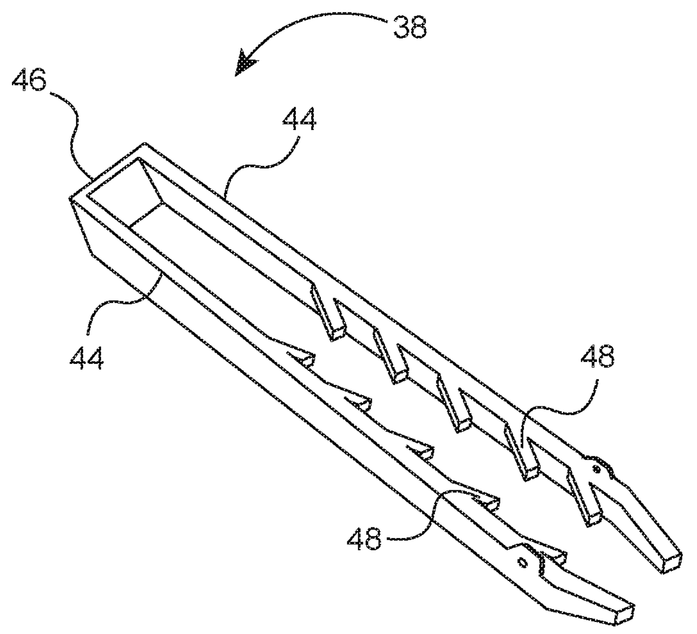
FIG. 5 is a perspective view of slip of the needle cartridge of FIG. 2.
Figure 6:
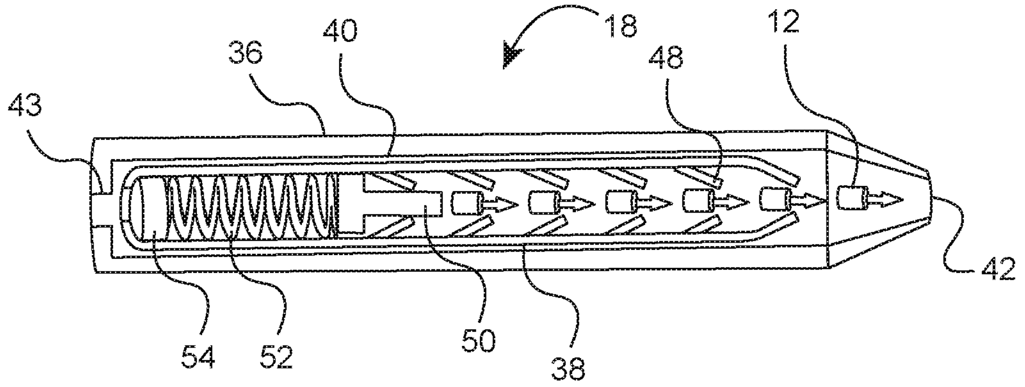
FIG. 6 is a diagrammatic view of the needle cartridge of the acupressure point device of FIGS. 1 and 2.
Figure 7:
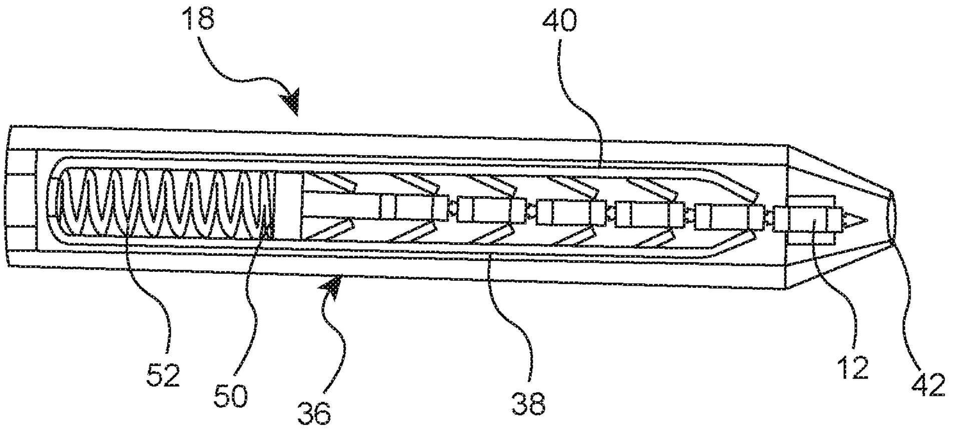
FIG. 7 is partially transparent top plan view of the needle cartridge of FIG. 2.
Figure 8:
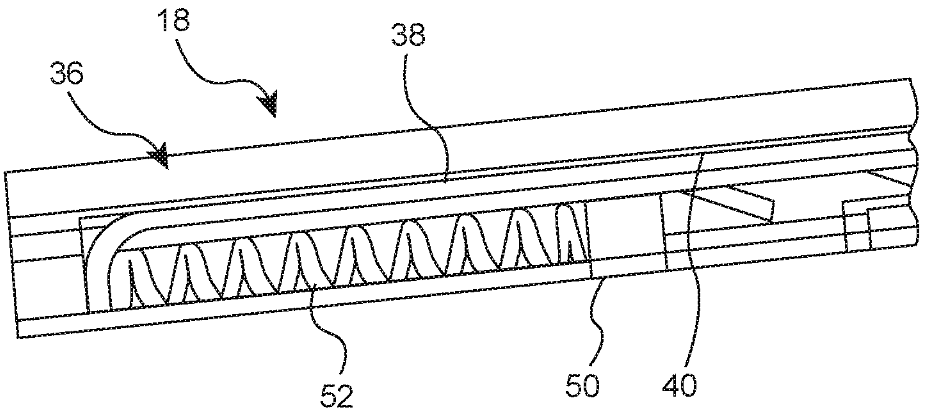
FIG. 8 is partially transparent and fragmented side elevational view of the needle cartridge of FIG. 2.
Figure 9:
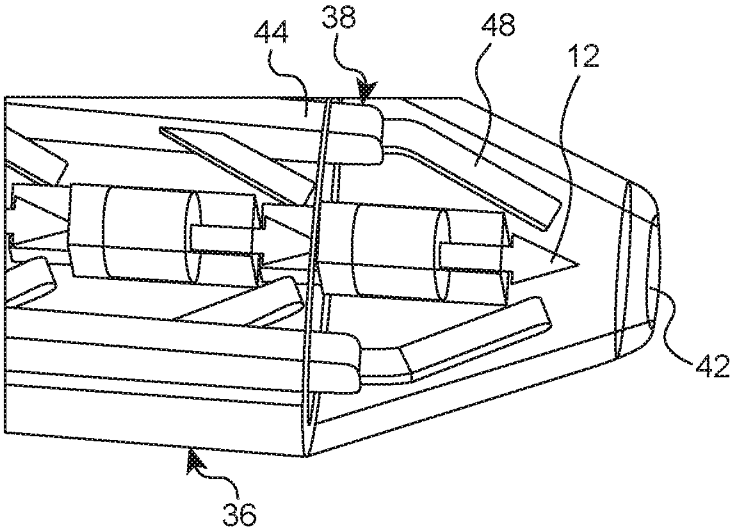
FIG. 9 is an enlarged view of the forward end of the needle cartridge of FIG. 7.

As best seen in FIG. 3, each of the illustrated plurality of acupuncture needles 12 includes a non-compliant and detachable tab 26 and a needle 28 extending therefrom. The illustrated detachable tab 26 is cylindrically shaped but any other suitable shape can be utilized. The detachable tab 26 is sized and shaped to cooperate with the needle cartridge 18 and/or vice versa to enable the acupuncture needles 12 to be supported within and move through the needle cartridge 18 as desired. Once the needle 28 of the acupuncture needle 12 is inserted into the patent's skin as described hereinafter 12, the detachable tab 26 can be detached from the needle 28. It is noted that the acupuncture needles 12 can alternatively have any other suitable configuration, such as, for example but not limited to, the detachable tab 26 can be modified or eliminated.

Figure 12:
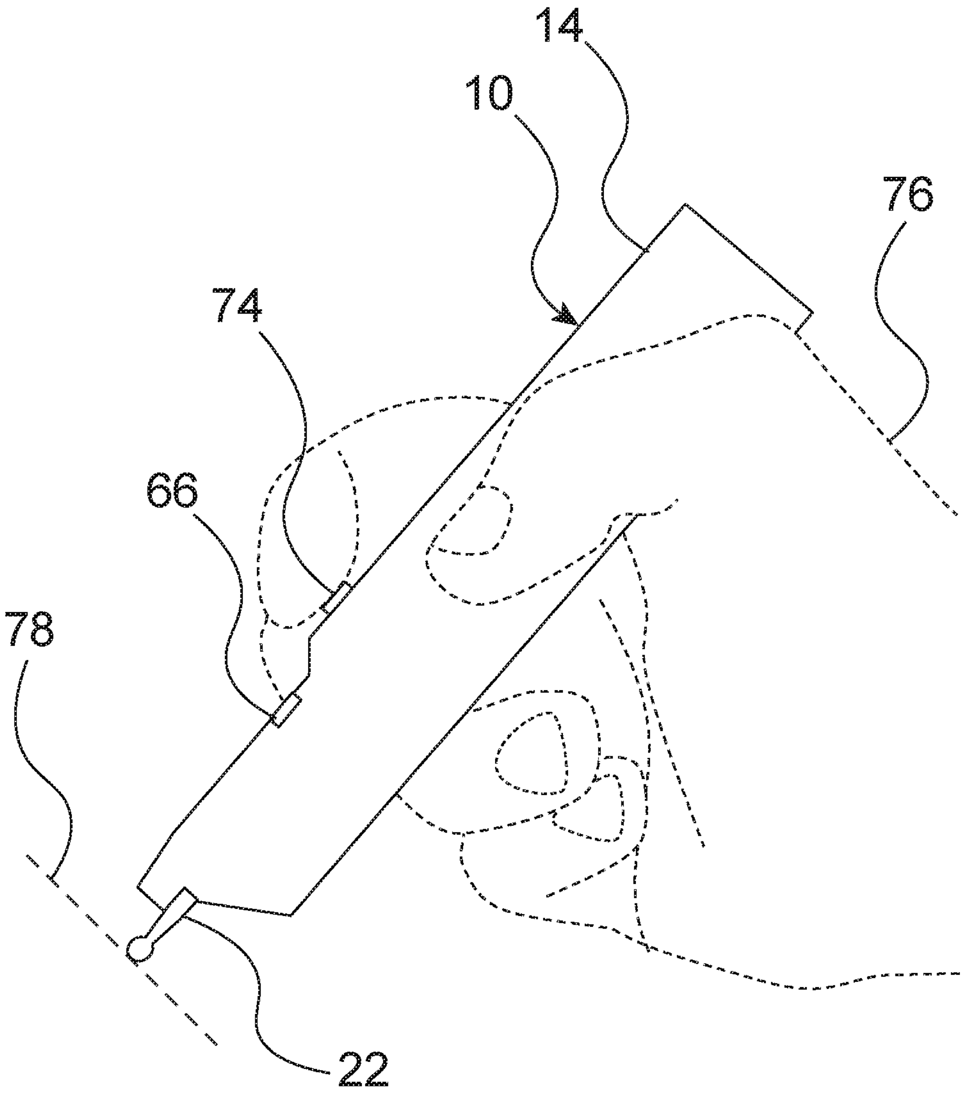
FIG. 12 is a diagrammatic view of a practitioner using the acupuncture system of FIGS. 1 to 12.

The illustrated elongate casing 16 is sized and shaped to be handheld manner (best shown in FIG. 12). The elongate casing 16 has a hollow interior 30 and a front opening 32 at a forward end of the elongate casing 16 that is sized for passage of the plurality of acupuncture needles 12 therethrough as described in more detail hereinafter. One or more means for accessing the hollow interior 30 are provided such as, for example but not limited to, an opening and/or door for inserting and removing the needle cartridge 18. It is noted that the elongate casing 16 can alternatively have any other suitable configuration.

The elongate casing 16 can be manufactured as a single continuous component or in two or more separate components secured together. The elongate casing 16 can also comprise any one or more materials. For example, but not limited to, the entire elongate casing 16 can comprise a suitable plastic material. It is noted that the elongate casing 16 can alternatively have any other suitable configuration.

As best shown in FIG. 3, the illustrated needle cartridge 18 is located within the hollow interior 30 of the elongate casing 16 and holds the plurality of acupuncture needles 12 therein with the acupuncture needles 12 directed toward the front opening 32 of the elongate casing 16. The needle cartridge 18 can be inserted into and removed out of the hollow interior 30 through a suitable opening. It is noted that needle cartridge 18 alternatively be inserted and/or removed from the elongate casing 16 in any other suitable manner.

As best shown in FIGS. 4 to 9, the illustrated needle cartridge 18 includes an elongate body 36 and a slip 38 located within an interior cavity or central bore 40 of the elongate body 36. The central bore 40 has an open top 41 along a central portion of the elongate body 36. The illustrated elongate body 36 extends from a rear or proximal end to a tapered forward or distal end. The tapered distal end 24 includes an opening or orifice 42 through which the acupuncture needles 12 may be selectively ejected from the needle cartridge 18 through the central bore 40. The illustrated proximal end includes a central rear opening 43.

Within the elongate body 36, the acupuncture needles 12 are held aligned by the slip 38 in series along a longitudinal axis of the elongate body 36 and aligned with the orifice 42. The acupuncture needles 12 are aligned, end-to-end, within the central bore 40 of the elongate body 36 of the needle cartridge 18. The illustrated slip 38 is located within the central bore 40 and includes a pair of longitudinally extending and laterally spaced-apart walls 44. The proximal or rear end of the walls 44 are connected by an end wall 46. A plurality of longitudinally spaced-apart pairs of chucks 48 extend angularly from the walls 44 in a laterally inward and forward direction. Each pair of chucks 48 extend inwardly toward each other from the spaced-apart walls 44 with one chuck 48 extending from one of the walls 44 and the other chuck 48 extending from the other of the walls 44. Each of the detachable tabs 26 of the plurality of acupuncture needles 12 engage the pairs of chucks 46 to restrict forward advancement of the acupuncture needles 12. The chucks 48 are resiliently flexible so that if a suitable longitudinal force is applied to the acupuncture needles 12, the chucks 48 will resiliently flex so that acupuncture needles 12 can advance forward one unit at a time as described in more detail herein after. The chucks 48 comprise a resiliently flexible material such as, for example but not limited to, spring steel or the like.

A piston 50 is located with the bore 40 rearward of the rearward most one of the acupuncture needles 12. A compression spring 52 is located within the bore 40 between the piston 50 and the end wall 46 of the slip 38 which resiliently urges the acupuncture needles 12 forward with enough force to maintain engagement between the acupuncture needles 12 and the chucks 48, but not enough force to advance the acupuncture needles 12 past the chucks 48. The illustrated compression spring 52 is a helical coil compression spring but any other suitable type of spring can alternatively be utilized. A pressure disk 54 is positioned between the compression spring 52 and the end wall 46 such that the plurality of acupuncture needles 12 may be advanced by unit increments along the bore 40 when a suitable force is selectively provided to the rear side of pressure disk 54 in the forward direction as described in more detail hereinafter. It is noted that the needle cartridge 18 can alternatively have any other suitable configuration.

The illustrated slip 38 includes six pairs of chucks 48 for controlling movement of six of the acupuncture needles 12. It is noted that the needle cartridge 18 can alternatively be configured for utilizing any other suitable quantity of acupuncture needles 12.

Figure 10:
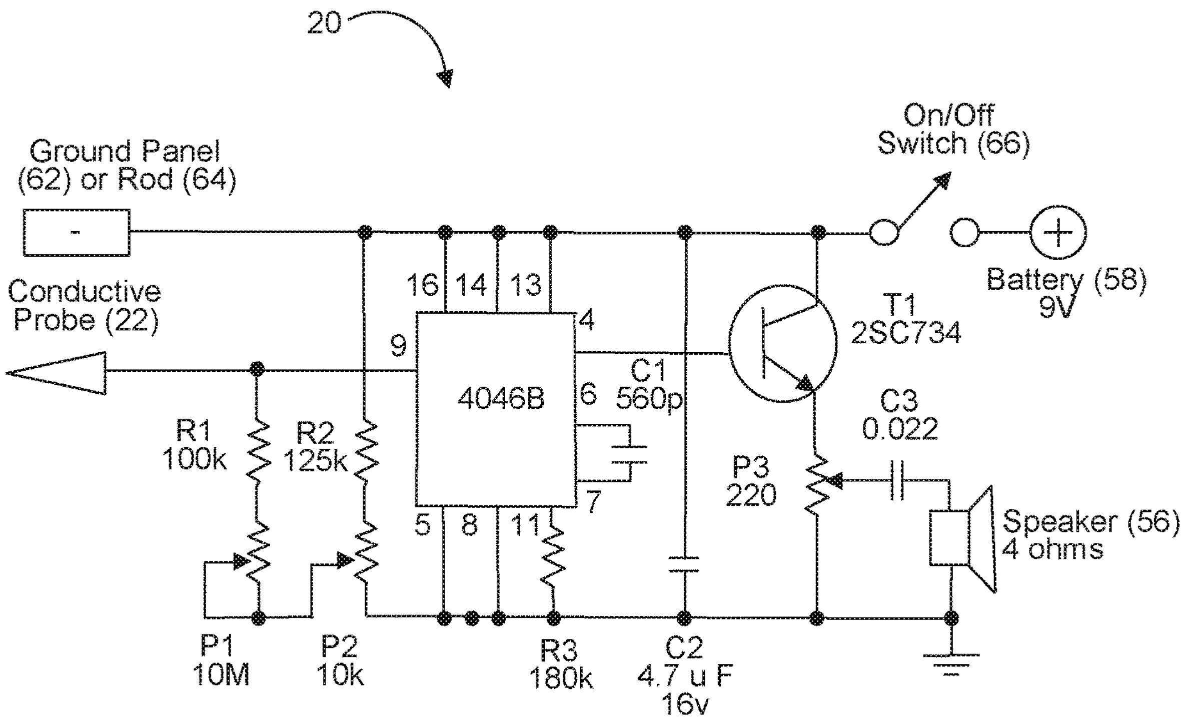
FIG. 10 is a schematic view of an acupressure-point locator circuit of the acupressure point device of FIG. 1.

As best shown in FIG. 10, the illustrated acupressure-point locator circuit 20 is configured to identify the plurality of acupressure points by measuring galvanic skin resistance and includes the conductive probe 22 located at the front opening 32 of the elongate casing 16 for engaging the patient's skin. The illustrated acupressure-point locator circuit uses a PLL IC CD4046. This is a CMOS IC with an integrated VCO. The frequency range of the VCO is set by the RC circuit R3/C1 along with the control voltage. The control voltage is provided by a voltage divider circuit which includes the skin resistance in conjunction with R1 and P1. The skin resistance is lower on the acupressure points. With a decreasing skin resistance, the control voltage and the frequency increases. The signal can be heard through a speaker 56 with louder and faster beeps when approaching an acupressure point). Transistor T1 delivers the power to drive the speaker 56. It is noted than any other suitable indicator can alternatively be utilized such as, for example but not limited to, an LED or other light source, and the like. The illustrated acupressure-point locator circuit 20 is powered by a 9-volt battery 58 but any other suitable power sources can alternatively be utilized with changes to the illustrated acupressure-point locator circuit 20. It is noted that the illustrated acupressure-point locator circuit 20 can alternatively have any other suitable configuration.

The illustrated electrically-conductive probe 22 is in the form of a metallic tip located at the forward end of the elongate casing 16 so that it is contacting the patient's skin when near an acupressure point and ready to insert one of the acupuncture needles 12. The illustrated conductive probe 22 includes a central and longitudinally-extending opening or passage 60 for selective passage of acupuncture needles 12 therethrough. The central opening 60 is aligned with the front opening 32 of the elongate casing 16 so that the acupressure-point device 14 does not need to be moved between identifying an acupressure point and inserting the acupuncture needle 12 into the identified acupressure point so that the acupuncture needle 12 is accurately inserted into the identified acupressure point. It is noted that the contact surface of the electrically-conductive probe 22 should be as small as possible and/or shaped so that it behaves like a point contact. It is also noted that the electrically-conductive probe 22 can alternatively have any other suitable configuration.

The illustrated acupressure-point locator circuit 20 also includes a ground panel 62 in the form of a metallic sheet or plate located on the exterior of the elongate casing 16 in a location in which the practitioner will make contact when holding the acupressure-point device 14 so that the practitioner may provide electrical grounding. It is noted that the practitioner may be required to contact the patient in order to complete the ground loop. Alternatively, the illustrated acupressure-point locator circuit 20 may include a separate hand-held ground probe or rod 64 that is held by the patient. The ground rod 64 can be connected to the acupressure-point locator circuit 20 with a wired connection. It is noted that the ground panel or rod 62, 64 can alternatively have any other suitable configuration.

The illustrated acupressure-point locator circuit 20 also includes an on-off switch 66. The illustrated on/off electrical switch 66 is a push-button type of electrical switch but any other suitable type of on/off electrical switch can be utilized. The illustrated on/off electrical switch 66 is located on the exterior of the surface of the elongate casing 16. It is noted that the on/off electrical switch 66 can alternatively have any other suitable configuration.

The illustrated acupressure-point locator circuit 20 is located within and/or on the hand/held elongate casing 16. However, some or all of the components of the acupressure-point locator circuit 20 can alternatively be located in a separate control box or the like that has a wired or wireless connection with the remainder acupressure-point device 14 within and/or on the handheld elongate casing 16. It is noted that the acupressure-point device 14 can alternatively have any other suitable configuration.

The illustrated actuator 24 is configured to selectively advance forward most one of the plurality of acupuncture needles 12 through the front opening 32 of the elongate casing 16, the central opening 60 of the electrically-conductive probe 22, and into an identified one of the plurality of acupressure points without moving the conductive probe 22 after the identified one of the acupressure points is identified by the acupressure-point locator circuit 20. The illustrated actuator 24 also selectively moves each of the other acupuncture needles 12 forward one position along the slip 38.

Figure 11:
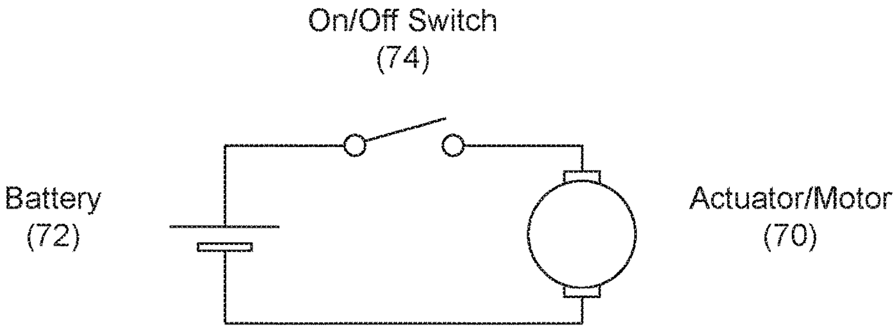
FIG. 11 is a schematic view of an actuator circuit of the acupressure point device of FIG. 1.

As best shown in FIGS. 2 and 11, the illustrated actuator 24 includes a longitudinally-extending actuation member 68. The illustrated actuation member 68 is a rod with circular cross-section but it is noted that the actuation member 68 can alternatively have any other suitable form. The illustrated actuation member 68 is located inside the elongate casing 16 with a forward end engageable with a rear side of the pressure disk 54 that is located within the needle cartridge 18. Thus, the actuation member 68 extends through openings within both the rear end of the elongate body 36 and the end wall 46 of the slip 38. The illustrated actuator 24 also includes an electric linear actuator 70 or the like that is powered by a battery 72 and controlled with an on/off switch 74. The electric linear actuator 70 is operably connected to the actuation member 68 for selective forward and rearward movement of the actuation member 69 toward and away from the pressure disk 54 of the needle cartridge 18. The illustrated on/off switch 74 is of a button type so that when the practitioner depresses the on/off switch 74, the actuating member 68 moves forward a distance suitable to move the acupuncture needles 12 within the needle cartridge 18 forward one position. It is noted that the on/off switch 74 can alternatively be of any other suitable type.

Thus, the actitation member 68 is selectively movable along the longitudinal axis of the needle cartridge 18. When the linear actuator 70 applies a forward force onto the rear end of the activation member 68, the actuation member 68 slides forward moving the pressure disk 54 forward. The forward movement of the pressure disk 54 compresses the spring 52 to forwardly move the piston 50 and the plurality of acupuncture needles 12. It is noted that the actuator 24 can alternatively have any other suitable configuration.

It is noted that additional and/or alternative mechanical and/or electro-mechanical mechanisms for advancing the acupuncture needles 12 within the needle cartridge 18 may be utilized so long as the needle cartridge 18 may be configured to be used with the acupressure-point device 14 such that insertion of the acupuncture needle 12 into the patient's skin is enabled without moving the acupressure-point device 14 after the acupressure point is identified.

As best shown in FIG. 12, the acupressure-point device 14 is held in the practitioner's hand 76 like a pencil or pen with the electrically-conductive probe 22 of the acupressure-point device 14 placed against the skin 78 of the patient near an acupressure point. The electrically-conductive probe 22 of the acupressure-point device 14 may be moved along the skin 78 by the practitioner while maintaining contact between the electrically-conductive probe 22 and the patient's skin 78, and while having skin contact with the metallic ground panel 62, so as to complete the acupressure-point locator circuit 20. Note that the practitioner's other hand should be contacting the skin 78 of the patient or other means for completing the ground circuit can be provided. A tone indicating a completed circuit is provided from the speaker 56. The frequency of the tone fluctuates as the ohmic resistance of the skin 78 changes. A particular tone may designate a location of the acupressure point if desired.

Once the acupressure point is detected by the changing tone of the acupressure-point device 14, the practitioner triggers the actuator 24 of the acupressure-point device 14 by pressing down the on/off switch 74. The actuator 24 then applies a forwardly directed force to the pressure disk 54 which compresses the compression spring 52. With sufficient distally directed force, the compression spring 52 advances the piston 50, which may overcome a friction force between the chucks 48 and the acupuncture needles 12. The most distal one of acupuncture needles 12 may be ejected through the orifice 42 of the needle cartridge 18, through the central opening 60 of the electrically-conductive probe 22. and into the patient's skin 78 at the located acupressure point. The detachable tab 26 of the acupuncture needle 12 may then be removed from the needle 28 for the acupuncture treatment.

Figure 13:
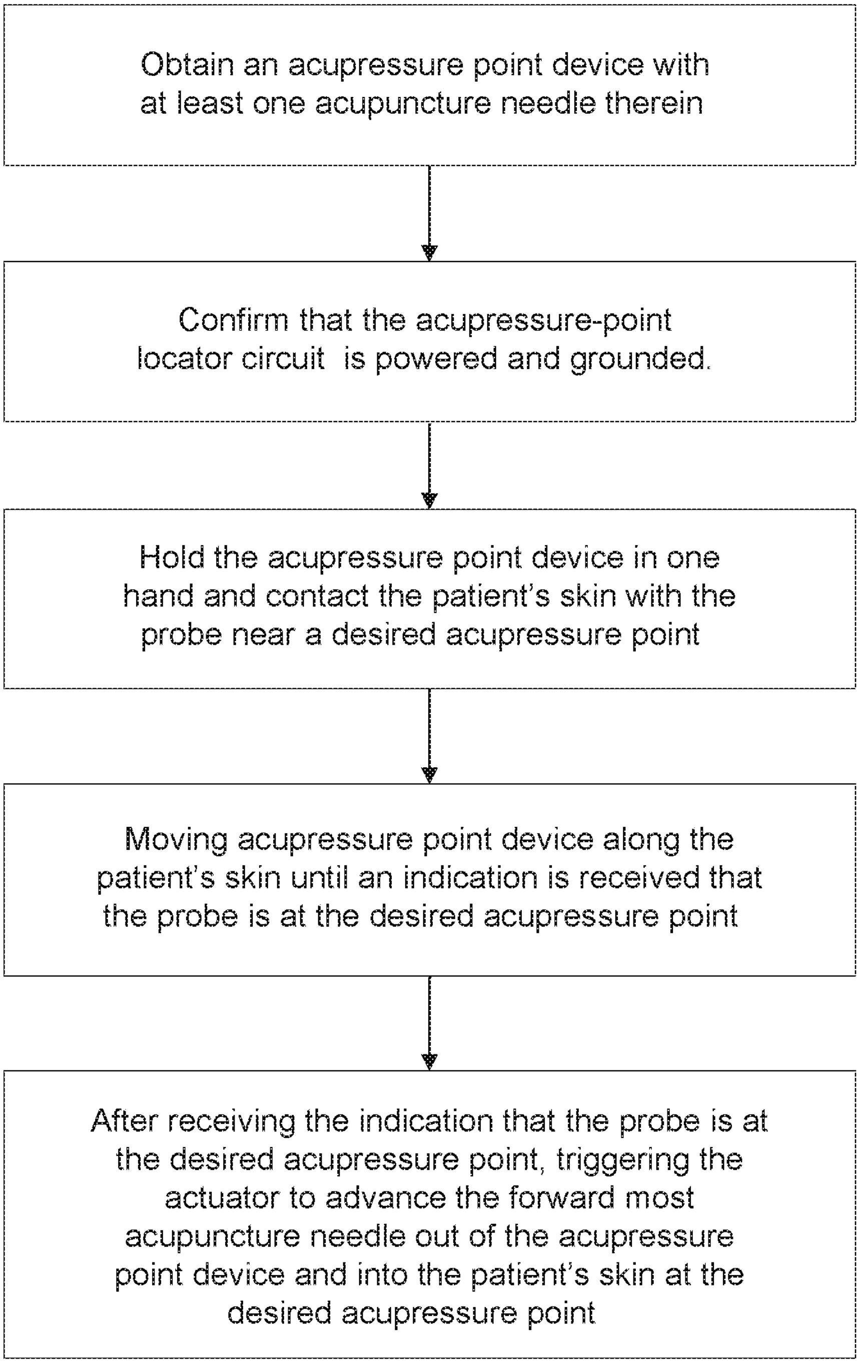
FIG. 13 is a flow chart for a method of using the acupuncture system of FIG. 1.

FIG. 13 illustrates a method of inserting at least one of a plurality of acupuncture needles 12 into a patient's skin at one or more of a plurality of acupressure points. The method includes the steps of obtaining an acupuncture device 14 having an elongate casing 16 configured to be handheld and having a hollow interior 30 or extending through at least a portion thereof and forming a front opening 32 at a forward end of the elongate casing 16, a needle cartridge 18 located within the hollow interior 30 and holding the plurality of acupuncture needles 12, an acupressure-point locator circuit 20 configured to identify the acupressure points by measuring galvanic skin resistance and including a conductive probe 22 located at the front opening 32 of the elongate casing 16 for engaging the patient's skin 78, and an actuator 24 configured to selectively advance at least one of the plurality of acupuncture needles 12 through the front opening 32 of the elongate casing 16 and into an identified one of the acupressure points. Next, is the step of moving the conductive probe 22 along and in contact the patient's skin 78 until the acupressure-point locator circuit 20 provides an indication that the conductive probe 22 is located at a first desired one of the acupressure points. Then, after receiving the indication that the conductive probe 22 is located at the first desired one of the plurality of acupressure points, triggering the actuator 24 to advance a first one of the plurality of acupuncture needles 12 through the front opening 32 of the elongate casing 16 and into the patient's skin 78 at the first desired one of the plurality of acupressure points without moving the conductive probe 22 from the patient's skin 78 at the first desired one of the plurality of acupressure points. The last two steps can be repeated to advance a second one of the plurality of acupuncture needles 12 through the front opening 32 of the elongate casing 16 and into the patient's skin 78 at a second desired one of the plurality of acupressure points.

Figure 14:
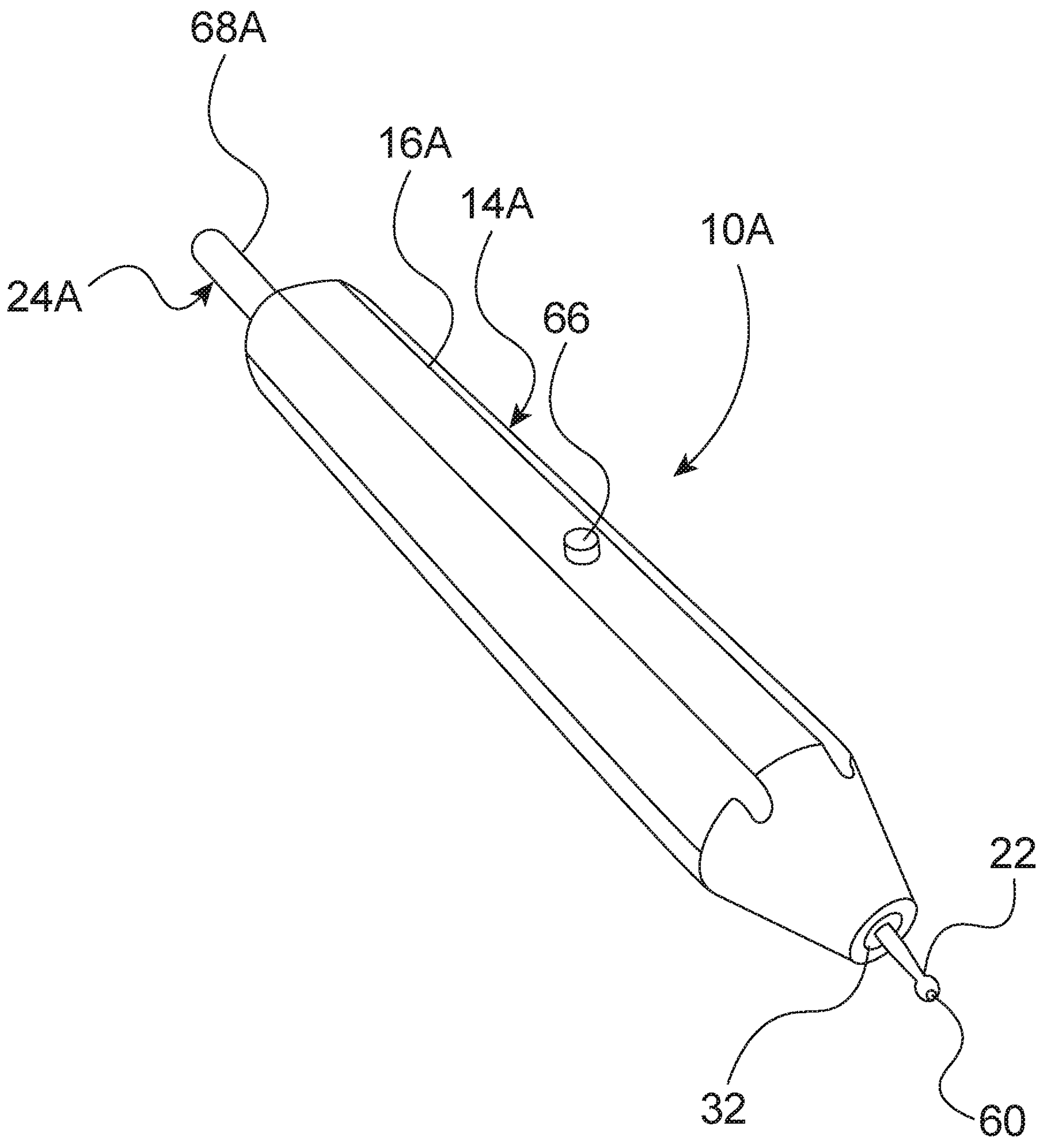
FIG. 14 is a perspective view of an acupuncture system having acupressure point device and a plurality of acupuncture needles in accordance with another embodiment of the present invention.
Figure 15:
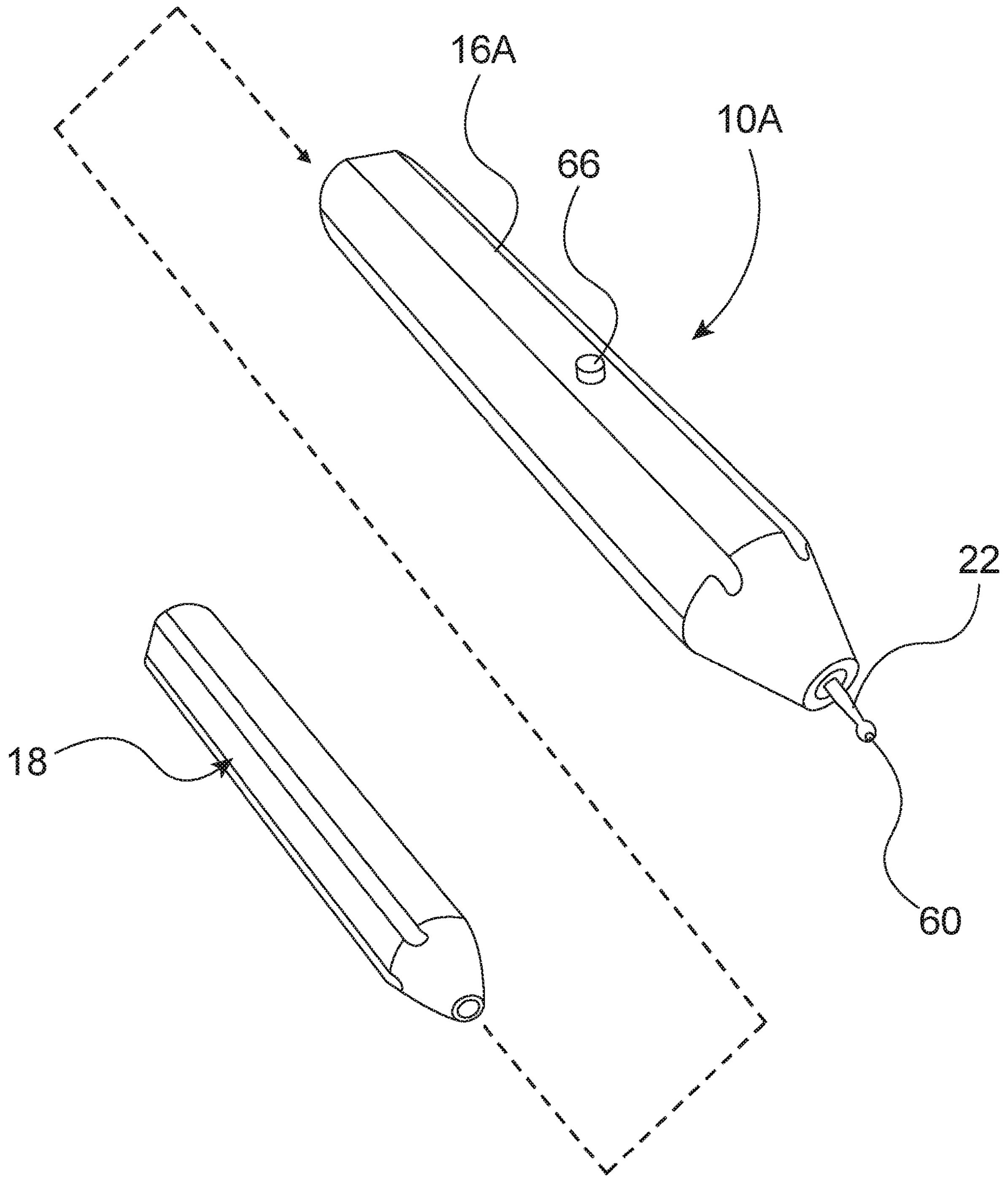
FIG. 15 is a partially-exploded perspective of the acupuncture system of FIG. 14 showing a removable needle cartridge removed form an elongate casing.
Figure 16:
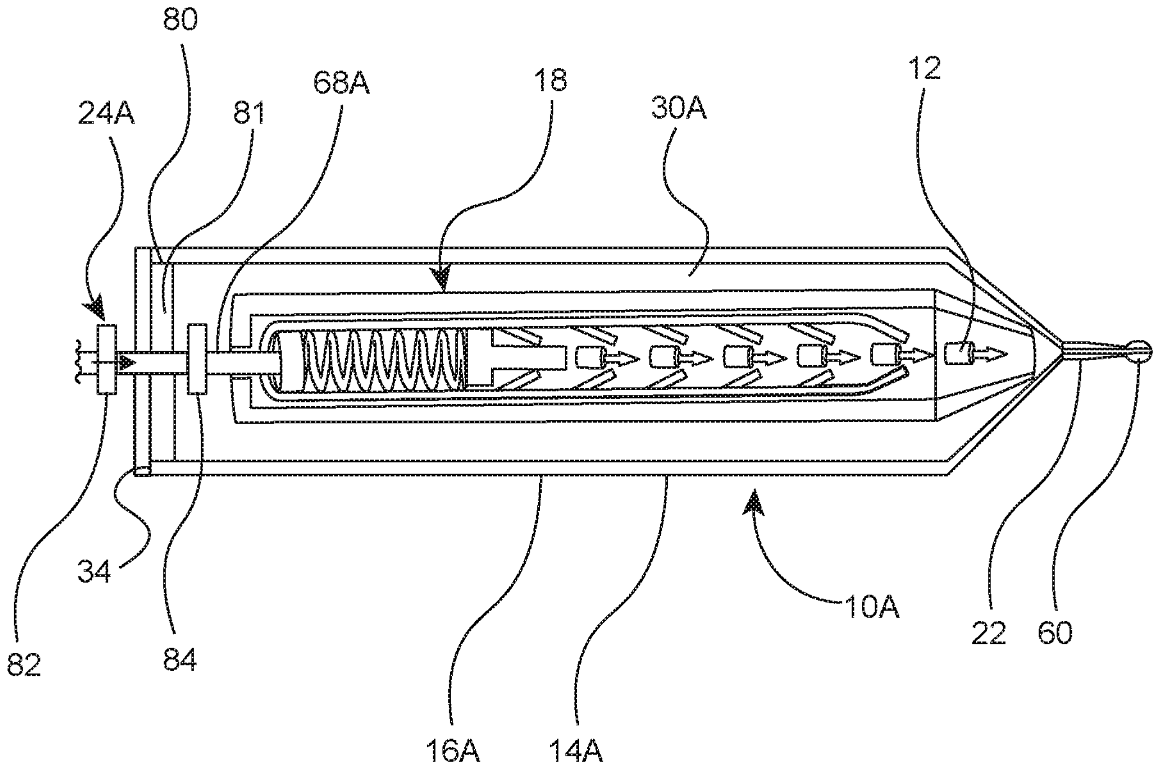
FIG. 16 is a diagrammatic view of a manual actuator of the acupressure point device of FIG. 14.

FIGS. 14 to 16 illustrate an acupuncture system 10A according to another embodiment of the present invention. This embodiment of the invention is substantially the same as the first embodiment of the invention described above except that the elongate casing 16A has a different size and shape and the actuator 24A is a mechanical actuator rather than an electro-mechanical actuator.

The illustrated elongate casing 16A is sized and shaped to be handheld in a pen-like or pencil-like manner. The outer surface of the illustrated elongate casing 16A is hexagon-shaped much like a standard pencil but the outer surface can alternatively have any other suitable shape. The forward end of the outer surface is tapered. That is, the forward end of the outer surface reduces in diameter to form a frustoconical shaped section much like a pen or sharpened-pencil. The elongate casing 16A has an interior passage 30A longitudinally extending through at least a portion thereof and forming a front opening 32 at a forward end of the elongate casing 16A that is sized for passage of the plurality of acupuncture needles 12 therethrough. The illustrated interior passage 30A extends entirely through the elongate casing 16A to also form a rear opening 34. It is noted that the forward end of the illustrated interior passage 30 reduces in diameter much like the exterior surface of the elongate casing 16A. It is noted that the elongate casing 16A can alternatively have any other suitable configuration.

As best shown in FIG. 16, the illustrated actuator 24A includes a longitudinally-extending actuation member 68A extending through a rear plug or cap 80 generally closing the rear opening 34 of the elongate casing 16A. The illustrated plug or cap 80 has a central opening 81 for passage of the actuation member 68A therethrough. The illustrated actuation member 68A is a rod with circular cross-section but it is noted that the actuation member can alternatively have any other suitable form. A rear end of the actuation member 68A is located outside the elongate casing 16A while an inner end of the actuation member 62A is engageable with a rear side of the pressure disk 54 within the needle cartridge 18. Thus, the actuation member 68A extends through openings within both the rear end of the elongate body 36 and the end wall 46 of the slip 38.

The actitation member 68A is movable along the longitudinal axis of the elongate casing 16 and the needle cartridge 18. When the practitioner manually applies a forward force onto the rear end of the activation member 68A, the actuation member 68A slides forward moving the pressure disk 54 forward. The forward movement of the pressure disk 54 compresses the spring 52 to forwardly move the piston 50 and the plurality of acupuncture needles 12. A rear stop 82 is rigidly secured to the actuation member 68A outside of the plug or cap 80 so that forward movement of the actuation member 68A is stopped when the rear stop 82 engages the rear plug or cap 80. A front stop 84 is rigidly secured to the actuation member 68A inside of the plug or cap 80 and rearward of the needle cartridge 18 so that when the actuation member 68A is released, rearward movement of the actuation member 68A, caused by the spring 52, is stopped when the front stop 84 engages the rear plug or cap 80. Thus, retaining the actuation member 62A to the elongate casing 16A. The distance between the rear and front stops 82, 84 defines the stroke of the actuation member 68A which preferably indexes each of the acupuncture needles 12 forward one position and inserts the forward most acupuncture needle 12 into the skin 78 of the patient at the identified acupressure point. It is noted that the actuator 24A can alternatively have any other suitable configuration.

It is again noted that additional and/or alternative mechanical and/or electro-mechanical mechanisms for advancing the acupuncture needles 12 within the needle cartridge 18 may be utilized so long as the needle cartridge 18 may be configured to be used with the acupressure-point device 14 such that insertion of the acupuncture needle 12 into the patient's skin is enabled without moving the acupressure-point device 14 after the acupressure point is identified.

Figure 17:
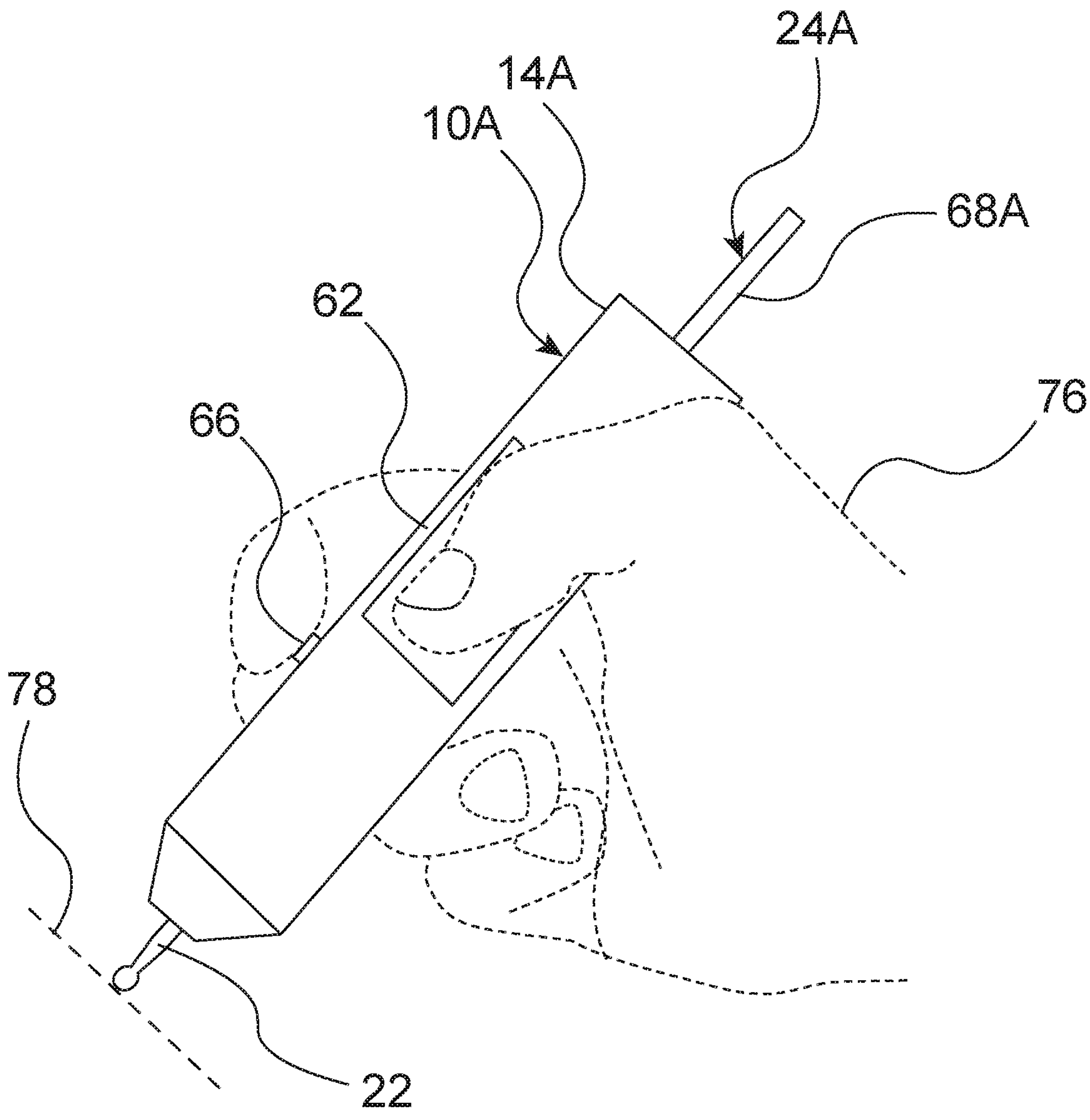
FIG. 17 is a diagrammatic view of a practitioner using the acupuncture system of FIGS. 14 to 16.

As best shown in FIG. 17, the acupressure-point device 14A is held in the practitioner's hand 76 like a pencil or pen with the electrically-conductive probe 22 of the acupressure-point device 14 placed against the skin 78 of the patient near an acupressure point. The electrically-conductive probe 22 of the acupressure-point device 14A may be moved along the skin 78 by the practitioner while maintaining contact between the electrically-conductive probe 22 and the patient's skin 78, and while having skin contact with the metallic ground panel 62, so as to complete the acupressure-point locator circuit 20. Note that the practitioner's other hand should be contacting the skin 78 of the patient or other means for completing the ground circuit can be provided. A tone indicating a completed circuit is provided from the speaker 58. The frequency of the tone fluctuates as the ohmic resistance of the skin 78 changes. A particular tone may designate location of the acupressure point if desired.

Once the acupressure point is detected by the changing tone of the acupressure-point device 14A, the practitioner triggers the actuator 24A of the acupressure-point device 14A by manually pushing forward on the rear end of the actuation member 68A until the rear stop 82 engages the plug 80. This applies a forwardly directed force to the pressure disk 54 which compresses the compression spring 52. With sufficient distally directed force, the compression spring 52 advances the piston 50, which may overcome a friction force between the chucks 48 and the acupuncture needles 12. The most distal one of acupuncture needles 12 may be ejected through the orifice 42 of the needle cartridge 18, through the central opening 60 of the electrically-conductive probe 22. and into the patient's skin 78 at the located acupressure point. The detachable tab 26 of the acupuncture needle 12 may then be removed from the needle 28 for the acupuncture treatment.

It is noted that each of the features of the illustrated embodiments can be utilized with the other embodiments. Such as, for example but not limited to the first illustrated embodiment of the acupuncture system 10 can alternatively have a manual actuator 62A like the second illustrated embodiment of the acupuncture system 10A or the second illustrated embodiment of the acupuncture system 10A can have an electro-mechanical actuator 24 like the first illustrated embodiment of the acupuncture system 10.

The terms "comprises," "comprising," "includes," "including," "has," "having," or any other variations thereof used herein, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

Reference to "one embodiment," "certain embodiments," "an embodiment," "implementation(s)," "aspect(s)," or similar terms used herein means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

The term "or" as used herein is to be interpreted as an inclusive or meaning any one or any combination. Therefore, "A, B or C" means "any of the following: A; B; C; A and B; A and C; B and C; A, B and C." An exception to this definition will occur only when a combination of elements, functions, steps or acts are in some way inherently mutually exclusive. Also, grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

All patents, patent applications (and any patents which issue thereon, as well as any corresponding published foreign patent applications), publications, and other documents mentioned throughout this description are hereby incorporated by reference herein. It is expressly not admitted, however, that any of the documents incorporated by reference herein teach or disclose the present invention.

The words "about," "approximately," or the like, when accompanying a numerical value, are to be construed as indicating a deviation as would be appreciated by one of ordinary skill in the art to operate satisfactorily for an intended purpose.

It should be understood that every maximum numerical limitation given throughout this specification includes every lower numerical limitation, as if such lower numerical limitations were expressly written herein. Every minimum numerical limitation given throughout this specification includes every higher numerical limitation, as if such higher numerical limitations were expressly written herein. Every numerical range given throughout this specification includes every narrower numerical range that falls within such broader numerical range, as if such narrower numerical ranges were all expressly written herein.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

References herein to items in the singular should be understood to include items in the plural, and vice versa, unless explicitly stated otherwise or clear from the text.

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. An acupuncture system comprising:

a plurality of acupuncture needles for insertion into a patient's skin at one or more of a plurality of acupressure points;

an elongate casing configured to be handheld and having a passage extending through at least a portion thereof and forming an opening at a forward end of the elongate casing for passage of the plurality of acupuncture needles therethrough;

a needle cartridge located within the passage and holding the plurality of acupuncture needles;

an acupressure-point locator circuit configured to identify the plurality of acupressure points by measuring galvanic skin resistance and including a conductive probe located at the opening of the elongate casing for engaging the patient's skin; and an actuator configured to selectively advance at least one of the plurality of acupuncture needles through the opening of the elongate casing and into an identified one of the plurality of acupressure points without moving the conductive probe after the identified one of the acupressure points is identified by the acupressure-point locator circuit.

2. The acupuncture system according to claim 1, wherein each of the plurality of acupuncture needles includes a non-compliant and detachable tab portion and a needle portion extending from the tab portion and configured to insert into the patient's skin.

3. The acupuncture system according to claim 1, wherein the passage extends entirely through the elongate casing.

4. The acupuncture system according to claim 1, wherein the probe has a central opening for selective passage of the plurality of acupuncture needles therethrough.

5. The acupuncture system according to claim 1, wherein the plurality of acupuncture needles aligned in series along a longitudinal axis of the needle cartridge.

6. The acupuncture system according to claim 5, wherein the needle cartridge includes an elongate body configured to be received within the passage of the elongate casing and includes a longitudinally extending bore having an orifice at a forward end of the elongate body through which the plurality of acupuncture needles may be selectively ejected.

7. The acupuncture system according to claim 6, wherein the needle cartridge further includes a slip located within the bore of the elongate body and having a plurality of radially inwardly extending chucks that limit forward movement of the plurality of acupuncture needles so that the plurality of acupuncture needles can be selectively advanced in unit increments along bore by the actuator.

8. The acupuncture system according to claim 7, wherein the needle cartridge further includes a piston within the slip and rear of the plurality of acupuncture needles, a spring rearward of the piston and urging the piston forward and in engagement with the rear most acupuncture needle, and a pressure disk rearward of the spring so that selective forward movement of the pressure disk by the actuator causes forward movement of the piston that overcomes resistance of the chucks to index each the plurality of acupuncture needles one spot forward.

9. An acupuncture device for inserting one of a plurality of acupuncture needles into a patient's skin at one or more of a plurality of acupressure points, said acupuncture device comprising;

an elongate casing configured to be handheld and having a passage extending through at least a portion thereof and forming an opening at a forward end of the elongate casing;

a needle cartridge located within the passage and holding the plurality of acupuncture needles;

an acupressure-point locator circuit configured to identify the acupressure points by measuring galvanic skin resistance and including a probe located at the opening of the elongate casing for engaging the patient's skin; and an actuator configured to selectively advance at least one of the plurality of acupuncture needles through the opening of the elongate casing and into an identified one of the acupressure points without moving the probe after the identified one of the acupressure points is identified by the acupressure-point locator circuit.

10. The acupuncture device according to claim 9, wherein the passage extends entirely through the elongate casing.

11. The acupuncture device according to claim 9, wherein the probe has a central opening for selective passage of the plurality of acupuncture needles therethrough.

12. The acupuncture device according to claim 9, wherein the plurality of acupuncture needles aligned in series along a longitudinal axis of the needle cartridge.

13. The acupuncture device according to claim 12, wherein the needle cartridge includes an elongate body configured to be received within the passage of the elongate casing and includes a longitudinally extending bore having an orifice at a forward end of the elongate body through which the plurality of acupuncture needles may be selectively ejected.

14. The acupuncture device according to claim 13, wherein the needle cartridge further includes a slip located within the bore of the elongate body and having a plurality of radially inwardly extending chucks that limit forward movement of the plurality of acupuncture needles so that the plurality of acupuncture needles can be selectively advanced in unit increments along bore by the actuator.

15. The acupuncture device according to claim 14, wherein the needle cartridge further includes a piston within the slip and rear of the plurality of acupuncture needles, a spring rearward of the piston and urging the piston forward and in engagement with the rear most acupuncture needle, and a pressure disk rearward of the spring so that selective forward movement of the pressure disk by the actuator causes forward movement of the piston that overcomes resistance of the chucks to index each the plurality of acupuncture needles one spot forward.

16. A method of inserting at least one of a plurality of acupuncture needles into a patient's skin at one or more of a plurality of acupressure points, the method comprising the steps of:

(a) obtaining an acupuncture device having an elongate casing configured to be handheld and having a passage extending through at least a portion thereof and forming an opening at a forward end of the elongate casing, a needle cartridge located within the passage and holding the plurality of acupuncture needles, an acupressure-point locator circuit configured to identify the acupressure points by measuring galvanic skin resistance and including a probe located at the opening of the elongate casing for engaging the patient's skin, and an actuator configured to selectively advance at least one of the plurality of acupuncture needles through the opening of the elongate casing and into an identified one of the acupressure points;

(b) moving the probe along and in contact the patient's skin until the acupressure-point locator circuit provides an indication that the probe is located at a first desired one of the acupressure points; and (c) after receiving the indication that the probe is located at the first desired one of the plurality of acupressure points, triggering the actuator to advance a first one of the plurality of acupuncture needles through the opening of the elongate casing and into the patient's skin at the first desired one of the plurality of acupressure points without moving the probe from the patient's skin at the first desired one of the plurality of acupressure points.

17. The method according to claim 16, wherein the probe has a central opening for selective passage of the plurality of acupuncture needles therethrough, and the step of triggering the actuator includes advancing the first one of the plurality of acupuncture needles through the central opening of the probe.

18. The method according to claim 16, further comprising the step of providing the indication that the probe is located at the first desired one of the acupressure points is in the form of providing a sound.

19. The method according to claim 16, wherein the actuator device includes a needle cartridge which holds the plurality of acupuncture needles aligned in series along a longitudinal axis of the needle cartridge, so that the plurality of acupuncture needles can be selectively advanced in unit increments by the actuator, and the step of triggering the actuator includes advancing each one of the plurality of acupuncture needles one of the unit increments.

20. The method according to claim 16, further comprising the step of repeating steps (a) to (c) to advance a second one of the plurality of acupuncture needles through the opening of the elongate casing and into the patient's skin at a second desired one of the plurality of acupressure points.

* * * * *